United States Patent
McElhoe (10) Patent No.: US 11,575,770 B2
(45) Date of Patent: Feb. 7, 2023

(54) METHOD FOR DEFINING NETWORK APPLICATION SECURITY BASED ON DECLARATIVE PROPERTIES

(71) Applicant: VMware, Inc., Palo Alto, CA (US)

(72) Inventor: Glenn Bruce McElhoe, Arlington, MA (US)

(73) Assignee: VMWARE, INC., Palo Alto, CA (US)

( * ) Notice: Subject to any disclaimer, the term of this patent is extended or adjusted under 35 U.S.C. 154(b) by 658 days.

(21) Appl. No.: 15/639,691

(22) Filed: Jun. 30, 2017

(65) Prior Publication Data

US 2019/0007518 A1     Jan. 3, 2019

(51) Int. Cl.
| | |
|---|---|
| *H04L 67/60* | (2022.01) |
| *G06F 8/60* | (2018.01) |
| *G06F 9/455* | (2018.01) |
| *H04L 67/10* | (2022.01) |
| *H04L 9/40* | (2022.01) |
| *H04L 43/04* | (2022.01) |

(52) U.S. Cl.
CPC ............... *H04L 67/60* (2022.05); *G06F 8/60* (2013.01); *G06F 9/455* (2013.01); *H04L 43/04* (2013.01); *H04L 63/20* (2013.01); *H04L 67/10* (2013.01)

(58) Field of Classification Search
CPC ......... H04L 67/32; H04L 43/04; H04L 67/10; H04L 63/20; G06F 9/455; G06F 8/60
See application file for complete search history.

(56) References Cited

U.S. PATENT DOCUMENTS

| | | | | |
|---|---|---|---|---|
| 2006/0080412 A1* | 4/2006 | Oprea | ................. | H04L 41/0843 709/220 |
| 2010/0251328 A1* | 9/2010 | Syed | ........................ | G06F 21/53 726/1 |
| 2013/0232480 A1* | 9/2013 | Winterfeldt | ............... | G06F 8/60 717/177 |
| 2015/0096011 A1* | 4/2015 | Watt | ..................... | H04L 63/0272 726/15 |
| 2015/0378702 A1* | 12/2015 | Govindaraju | ............. | G06F 8/61 717/177 |
| 2016/0036725 A1* | 2/2016 | Syed | ........................ | H04L 67/10 709/226 |
| 2016/0156661 A1* | 6/2016 | Nagaratnam | ........... | G06F 21/62 726/1 |
| 2016/0301746 A1* | 10/2016 | Bauer | ........................ | G06F 9/50 |
| 2017/0147335 A1* | 5/2017 | Parees | ........................ | G06F 8/30 |
| 2018/0123903 A1* | 5/2018 | Holla | ........................ | H04L 41/22 |

* cited by examiner

*Primary Examiner* — Benjamin R Bruckart
*Assistant Examiner* — Akshay Doshi
(74) *Attorney, Agent, or Firm* — Patterson + Sheridan, LLP (57) ABSTRACT

One or more embodiments provide techniques for processing a request for generating a network diagram for a multi-tier application to be deployed on a cloud computing environment. A deployment director receives a request to deploy the multi-tier application to the cloud computing environment. Deployment director receives an application blueprint of the multi-tier application from an application director. The application blueprint includes logical attributes and logical connections of each component. Deployment director receives an identification of the cloud computing environment. Deployment director generates a network diagram compatible with the cloud computing environment based on at least the application blueprint. The network diagram illustrates physical network structure of the cloud computing environment. Deployment director displays the network diagram.

21 Claims, 8 Drawing Sheets

METHOD FOR DEFINING NETWORK APPLICATION SECURITY BASED ON DECLARATIVE PROPERTIES

BACKGROUND

The use of monolithic applications in a computing system, such as a cloud computing system, is gradually being replaced by sets of loosely coupled, independent services. Factoring an application into small services (sometimes referred to as "micro-services") allows those services to have a developmental and operational lifecycle that is independent of their peers. These services typically have a smaller set of responsibilities than their monolithic predecessors, as well as a well-defined application programming interface (API).

The use of such a system of micro-services also comes at a cost: every service may use its own data model, use its own backing store, and define its own interfaces and its own interaction models. As the number of services increases, it becomes difficult to administer the system. As such, administrators and operators of such systems must possess deep system knowledge to identify runtime issues, and must be informed of the intricacies of every new service added to the system. The proliferation of service technologies also means that users of the system have to use various methods to interact with the system, with varying degrees of observability and extensibility.

SUMMARY

One or more embodiments provide techniques for processing a request for generating a network diagram for a multi-tier application to be deployed on a cloud computing environment. A deployment director receives a request to deploy the multi-tier application to the cloud computing environment. Deployment director receives an application blueprint of the multi-tier application from an application director. The application blueprint includes logical attributes and logical connections of each component. Deployment director receives an identification of the cloud computing environment. Deployment director generates a network diagram compatible with the cloud computing environment based on at least the application blue print. The network diagram illustrates physical network structure of the cloud computing environment. Deployment director displays the network diagram.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
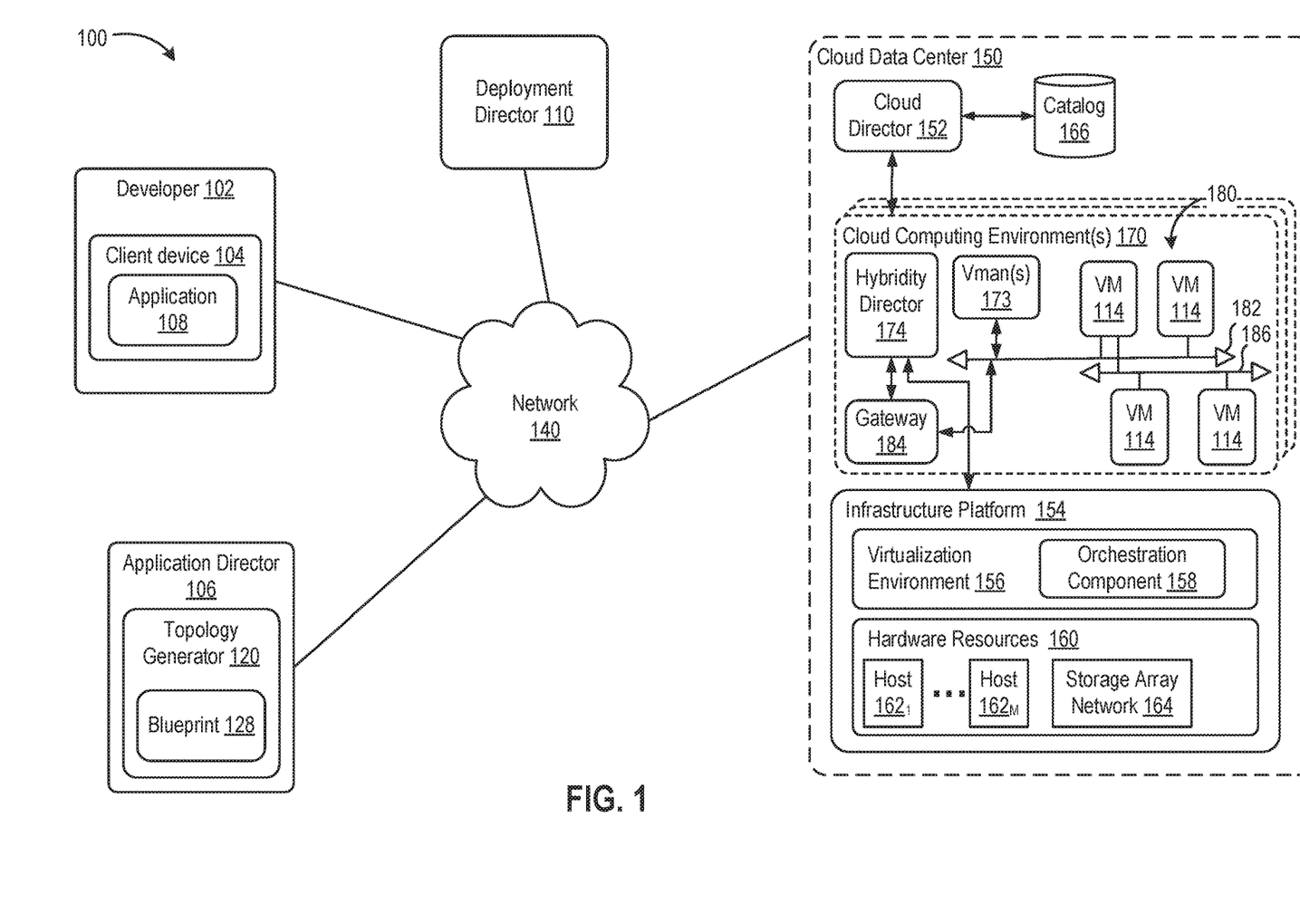
FIG. 1 is a block diagram of a system for deploying an application on multiple cloud computing environments, according to an embodiment.

FIG. 1 is a block diagram of a system for deploying an application on multiple cloud computing environments, according to an embodiment. In this embodiment, a multi-tier application created by developer 102 is being deployed for enterprise 100 in a deployment environment provided by a cloud data center 150 (sometimes referred to simply as "cloud provider"). As depicted in FIG. 1, cloud data center 150 may provide multiple deployment environments, for example, for development, testing, staging, and production of the application. Client device 104 may access services from cloud data center 150, for example, via REST (Representational State Transfer) APIs (Application Programming Interface) or any other client-server communication protocol. One particular implementation of a REST API for cloud computing services is vCloud Director® API available from VMware, Inc. Cloud data center 150 provides virtual computing resources (e.g., virtual machines or "VMs," 114) to provide a deployment environment, in which developer 102 can deploy a multi-tier application. One particular example of a deployment environment is one implemented using cloud computing services from a vCloud Data Center Services® available from VMWare, Inc.

In one or more embodiments, cloud data center 150 is configured to dynamically provide an enterprise (or users of an enterprise) with one or more virtual data centers 180 in which a user may provision VMs 114, deploy multi-tier applications on VMs 114, and/or execute workloads. Cloud data center 150 includes an infrastructure platform 154 upon which a cloud computing environment may be executed. In the particular embodiment of FIG. 1, infrastructure platform 154 includes hardware resources having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of VMs across hosts 162. It is recognized that hardware resources 160 of cloud data center 150 may in fact be distributed across multiple data centers in different locations.

Each cloud computing environment 170 is associated with a particular tenant of cloud data center 150, such as client device 104. In one embodiment, cloud computing environment 170 may be configured as a dedicated cloud service for a single tenant comprised of dedicated hardware resources 160 (i.e., physically isolated from hardware resources by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In an embodiment, virtualization environment 156 includes an orchestration component 158 (e.g., implemented as a process running in a VM) that provides infrastructure resources to a cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 114) on hosts 162 to support such requests. In an embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. Virtualization environment 156 may be implemented by running on hosts 162 VMware ESXi™-based hypervisor technologies provided by VMware, Inc. (although it should be recognized that other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST API or any other client-server communication protocol. Cloud director 152 may authenticate connection attempts from the enterprise using credentials issued by the cloud computing provided. Cloud director 152 maintains and publishes a catalog 166 of available virtual machine templates and packed virtual machine applications that represent virtual machines that may be provisioned in cloud computing environment 170. A virtual machine template is a virtual machine image that is loaded with a pre-installed guest operating system, applications, and data, and is typically used to repeatedly create a VM having the predefined configuration. A packaged virtual machine application is a logical container of pre-configured virtual machines having software components and parameters that define operational details of the packaged application. An example of a packaged VM application is vSphere® vAPP™ technology made available by VMware, Inc., although other technologies can be utilized. Cloud director 152 receives provisioning requests submitted (e.g., via REST API calls) and may propagate such requests to orchestration component 158 to instantiate the requested virtual machines (e.g., VMs 114). In the embodiment of FIG. 1, cloud computing environment 170 supports the creation of a virtual data center 180 having a plurality of virtual machines 114 instantiated to, for example, host deployed multi-tier applications, as well as one or more virtualization managers 173 (abbreviated at "Vmans(s)"). A virtual data center 180 is logical construct that provides compute, network, and storage resources to an organization. Virtual data centers 180 provide an environment where VM 114 can be created, stored, and operated, enabling compete abstraction between the consumption of infrastructure service and underlying resources.

Virtual data center 180 includes one or more virtual networks 182 used to communicate between VMs 114 and managed by at least one networking gateway component (e.g., gateway 184), as well as one or more isolated internal networks 186 not connected to gateway 184. Gateway 184 (e.g., executing as a virtual appliance) is configured to provide VMs 114 and other components in cloud computing environment 170 with connectivity to external network 140 (e.g., Internet). Gateway 184 manages external public IP addresses for virtual data center 180 and one or more private internal networks interconnecting VMs 114. Gateway 184 is configured to route traffic incoming to and outgoing from virtual data center 180 and provide networking services, such as firewalls, network address translation (NAT), dynamic configuration protocol (DHCP), and load balancing. Gateway 184 may be configured to provide virtual private network (VPN) connectivity over a network 140 with another VPN endpoint.

While FIG. 1 depicts a single connection between client device 104 and cloud-side gateway 184 for illustration purposes, it should be recognized that multiple connections between client device 104 and cloud-side gateways 184 may be used. Furthermore, while FIG. 1 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150. In one embodiment, each virtual data center 180 includes a "hybridity" director module (depicted as hybridity director 174) configured to communicate with in client device 104 to enable a common virtualized computing platform between client device 104 and cloud data center 150.

Developer 102 uses an application director 106, which may be running in one or more VMs, to orchestrate deployment of a multi-tier application onto one cloud computing environment 170. As illustrated, application director 106 may include a topology generator 120. Topology generator 120 generates a blueprint that specifies a logical topology of the application 108 to be deployed. Rather than using a network diagram, which conveys a physical infrastructure that is to be recreated virtually, topology generator 120 generates a logical blueprint of the VMs with information to convey the application intent. Topology generator 120 generates a blueprint 128 that specifies a logical topology of the application 108 to be deployed in a cloud computing environment 170. Blueprint 128 generally captures the structure of an application 108 as a collection of application components, executing on virtual computing resources, without including the physical architecture of the networks, as used in some techniques.

Figure 2:
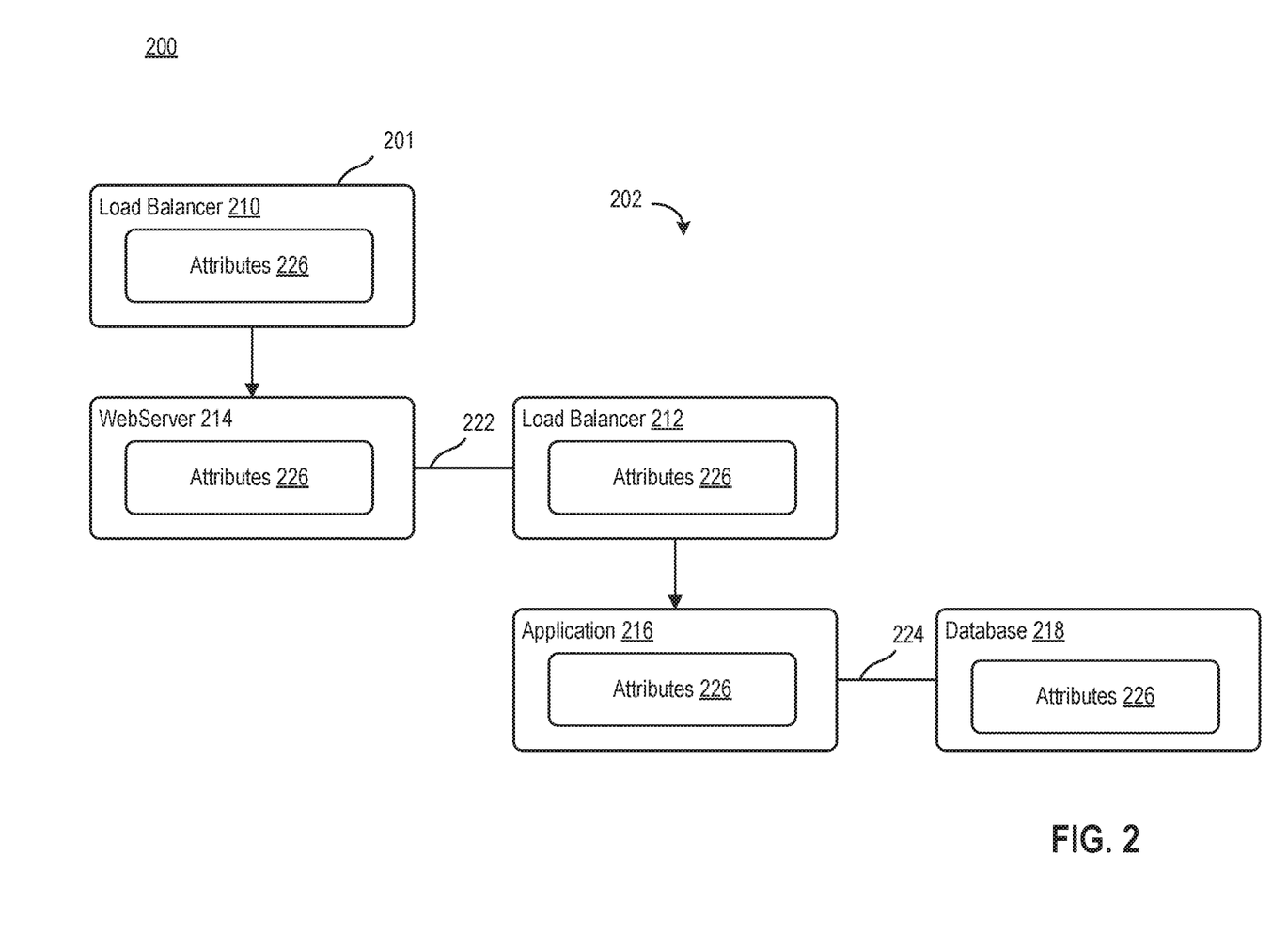
FIG. 2 illustrates an example blueprint that may be generated using topology generator on application director, according to an embodiment.

FIG. 2 illustrates an example blueprint 200 that may be generated using topology generator 120 on application director 106, according to an example. Blueprint 200 illustrates a multi-tier application 202 (e.g., a three-tier application). For example, multi-tier application 202 includes a load balancing tier, an application tier, and a database tier. Load balancing tier includes load balancer 210 and load balancer 212. Application tier includes WebServer 214 and Application 216. Database tier includes database 218. Blueprint 200 generally defines one or more dependencies between components 201 to indicate an installation order of each component 201 during deployment. For example, because a load balancer usually cannot be configured until a web application is up and running, a user may specify a dependency from WebServer 214 to Application 216.

When generating blueprint 200, a user, using topology generator 120, specifies one or more connections 222, 224 between components 201. For example, as illustrated there is a connection 222 between WebServer 214 and load balancer 212, and a connection 224 between Application 216 and database 208. Rather than specifying specific network connections in blueprint 200, a user may specify one or more logical attributes 226 associated with each component in blueprint 200. For example, each component 201 may include a first attribute $226_1$ directed to a network constraint and a second attribute $226_2$ directed to a port constraint. For example, those components with network constraints (i.e., load balancer 210) may be given routable IPs on the subsequent cloud computing environment 170. In another example, those components with port constraints (i.e., load balancer 210, WebServer 214, load balancer 212, Application 216, and Database 218), have specifically defined port numbers that respective components 201 are expected to communicate on. In those cases, where there is no port constraint, all ports of that specific component 201 are exposed.

Accordingly, by specifying one or more attributes 226 associated with each component 201 in the blueprint 200, and logical connections 222, 224 between one or more components 201, rather than having to include the physical network infrastructure to be recreated virtually; developer 102 can define a cloud-agnostic blueprint 200. In other words, developer 102 can define blueprint 200 once, and subsequently have blueprint 200 deployed on multiple cloud computing environments 170, such as, but not limited to vSphere, Amazon, Azure™ Google Cloud Platform (GCP), and the like.

Referring back to FIG. 1, after application director 106 generates blueprint 128 defining one or more logical connections between application components, as well as one or more logical attributes of each component, application director 106 transmits blueprint 128 to deployment director 110. Deployment director 110 may be an application running on a physical device or an application running in one or more VMs. Deployment director 110 is configured to receive one or more blueprints 128 from application director 106. Along with each blueprint 128, deployment director 110 receives information regarding each respective cloud computing environment 170 to which blueprint 128 will be deployed. For example, developer 102 specifies whether blueprint 128 will be deployed to a specific cloud, such as, but not limited to, Amazon Web Services™ (AWS) available from Amazon, Microsoft Azure™ available from Microsoft, KVM, and the like. In some embodiments, deployment director 110 chooses the endpoints based on what the cloud director 152 allows. In other embodiments, a developer may be prompted to choose among one or more available options. Deployment director 110 applies constraints of the target cloud computing environment (e.g., AWS, Azure™, KVM, etc.) to blueprint 128 based on the one or more logical connections and one or more logical attributes of each component in blueprint 128 to generate a network blueprint 300, specific to the target cloud computing environment.

Figure 3:
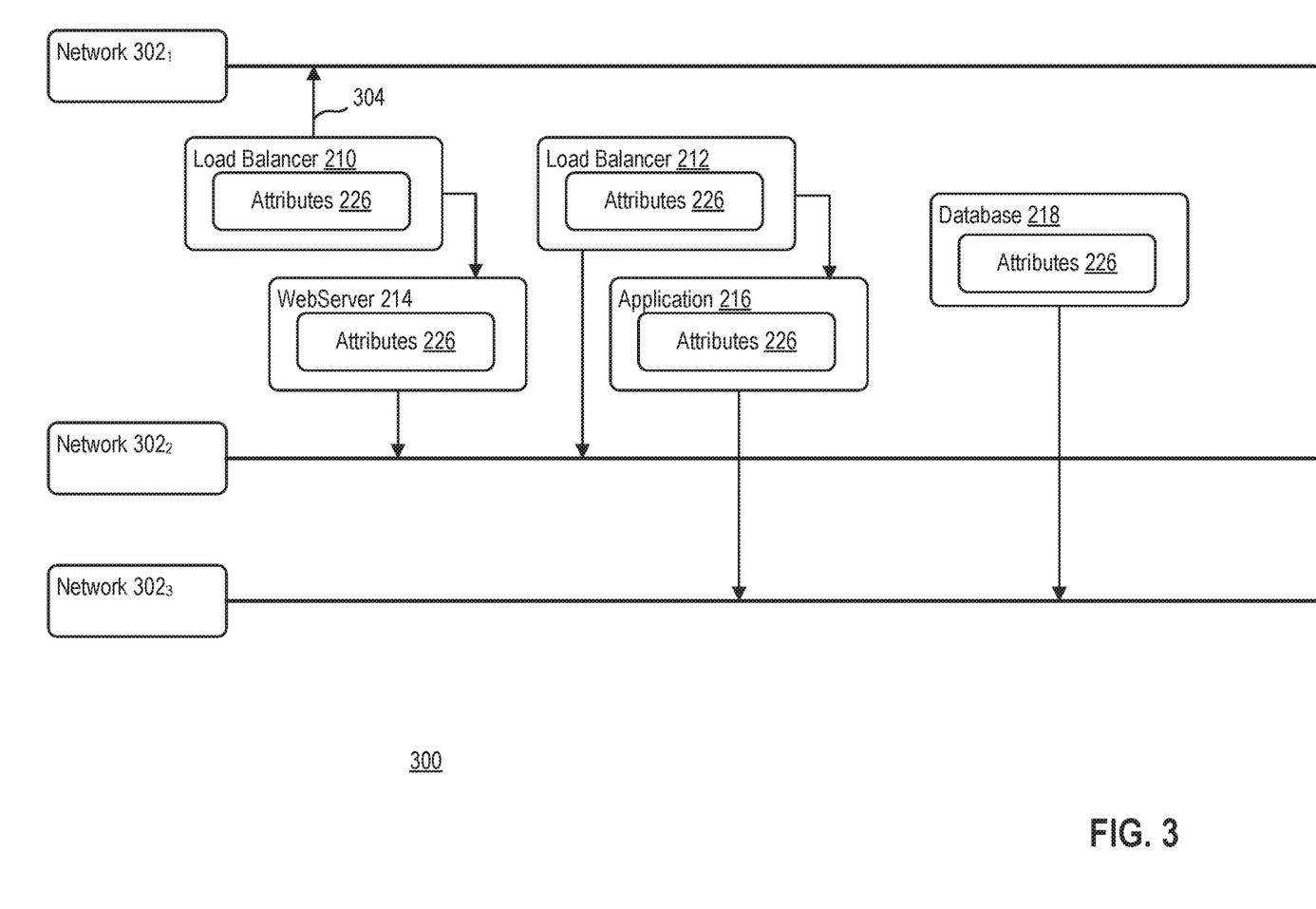
FIG. 3 illustrates an example network blueprint, according to an embodiment

FIG. 3 illustrates an example network blueprint 300, according to an embodiment. Network blueprint 300 is a generic blueprint that does not specify the constraints of any specific cloud computing environment. Rather, network blueprint 300 illustrates an example blueprint 300 after deployment director 110 receives cloud constraints from cloud director 152 of target cloud environment.

Network blueprint 300 includes components 201 in blueprint 200, as well as a visual specification of the networks upon which each component will land. For example, network blueprint 300 illustrates network $302_1$, network $302_2$, and network $302_3$. Network $302_1$ is a public network, and networks $302_2$, $302_3$ are private networks. Each line 304 extending between a component 201 and a network $302_i$ represents a virtual network interface card (vNIC) 304 therebetween. As illustrated, WebServer 214 in FIG. 2 through logical connection lines, Web Server 214 is not allowed to communicate with Database 218. Accordingly, when deployment director 110 translates logical blueprint 128 into network blueprint 300, deployment director lands WebServer 214 on network $302_2$ and Database 218 on network $302_3$. Additionally, blueprint 200 specified in logical attributes that 226 that Load Balancer 210 would land on a public network. Accordingly, when deployment director 110 translates logical blueprint 128 into network blueprint 300, deployment director 110 lands Load Balancer 210 on network $302_1$, which is public.

Figure 4:
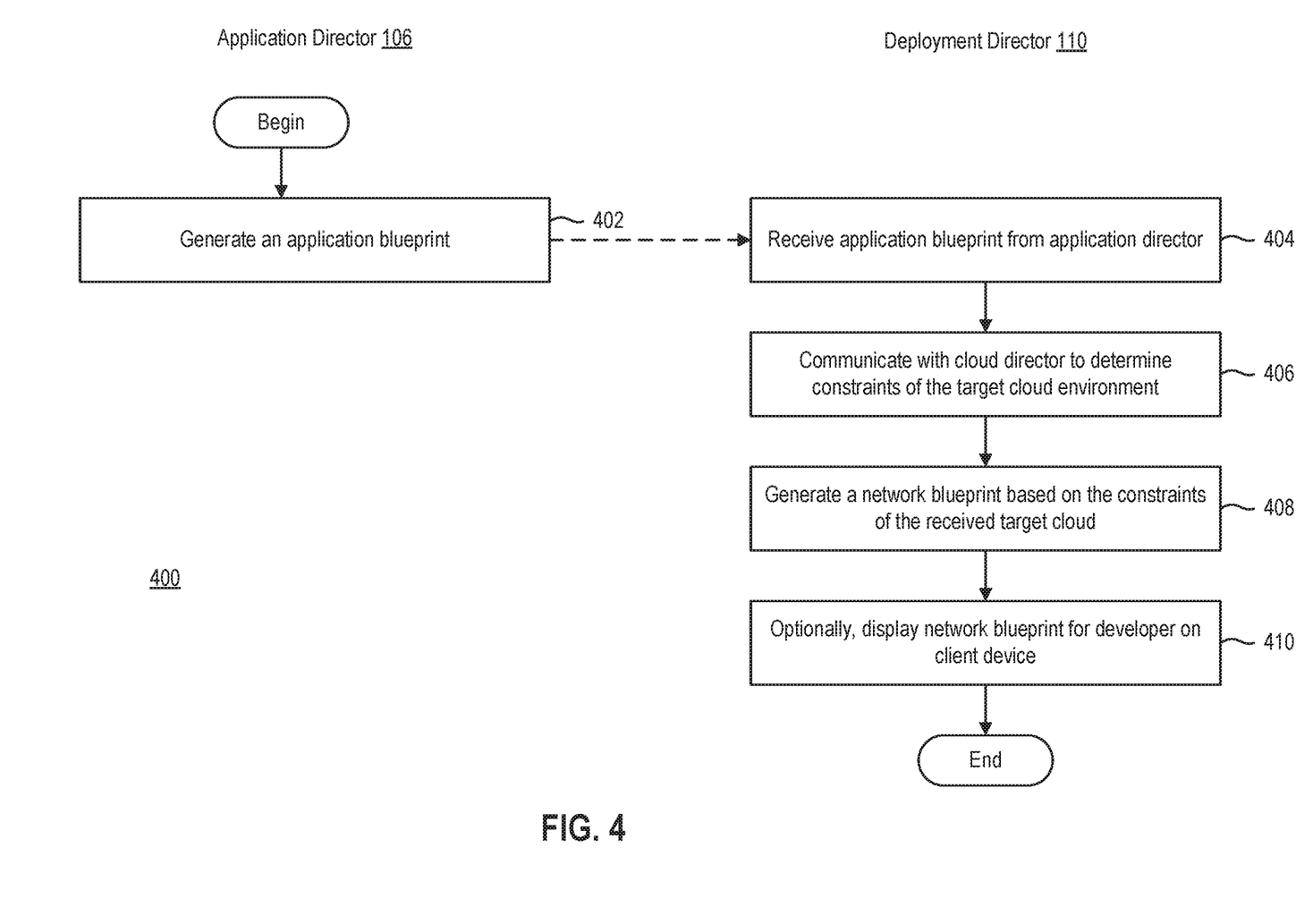
FIG. 4 is a flow diagram illustrating a method of generating a network diagram for an application to be deployed in a cloud computing environment, according to an embodiment.

FIG. 4 is a flow diagram illustrating a method 400 of generating a network diagram for an application 108 to be deployed in a cloud computing environment, according to one embodiment. At block 402, application director 106 generates an application blueprint 128. For example, topology generator 120 generates a blueprint that specifies a logical topology of the application 108 to be deployed. Topology generator 120 includes one or more logical connections between components in application 108. Logical connections between components aid in defining dependencies among components of application 108. Additionally, topology generator 120 includes one or more logical attributes for each component of application 108. By generating logical connections between components in application 108, and logical attributes for each component, application director 106 is able to generate a cloud-agnostic blueprint, which can subsequently be used to deploy application 108 in any cloud computing environment.

At block 404, deployment director 110 receives application blueprint 128 from application director 106. For example, deployment director 110 may be executing on a separate device or VM from application director 106. In some embodiments, deployment director 110 and application director 106 execute on the same device or VM. Along with application blueprint 128, deployment director 110 receives a target cloud computing environment from developer 102. Such target cloud computing environment may be any commercial cloud computing environment, such as, but not limited to, AWS™, Azure™, KVM, and the like.

At block 406, deployment director 110 communicates with cloud director 152 to determine the constraints of the target cloud computing environment. The constraints of the target cloud computing environment may be directed to how one or more machines or applications are isolated from each other. For example, in one target cloud computing environment, cloud director 152 may limit a number of IP addresses available to the developer 102 for application 108. In another example, in another target cloud computing environment, cloud director 152 may not put a limit on a number of IP addresses. Generally, the constraints of the target cloud are related to the network structure of the target cloud.

At block 408, deployment director 110 generates a network blueprint based on the constraints of the received target cloud. Deployment director 110 applies the network constraints to logical blueprint 128. Together with the network constraints provided by deployment director 110 as well as logical connections and logical attributes defined in blueprint 128, deployment director 110 generates a network blueprint that is compatible with target cloud computing environment.

At block 410, deployment director 110 may optionally display network blueprint for developer 102 on client device 104. For example, in those embodiments where deployment director 110 is remote from client device 104, deployment director 110 transmits network blueprint to client device 104. Developer 102 may optionally edit network blueprint when displayed on client device 104. For example, developer may subsequently refine which components of application 108 are configured to communicate, which components of application 108 are available on a public network, and any other network relationship between components.

Figure 5:
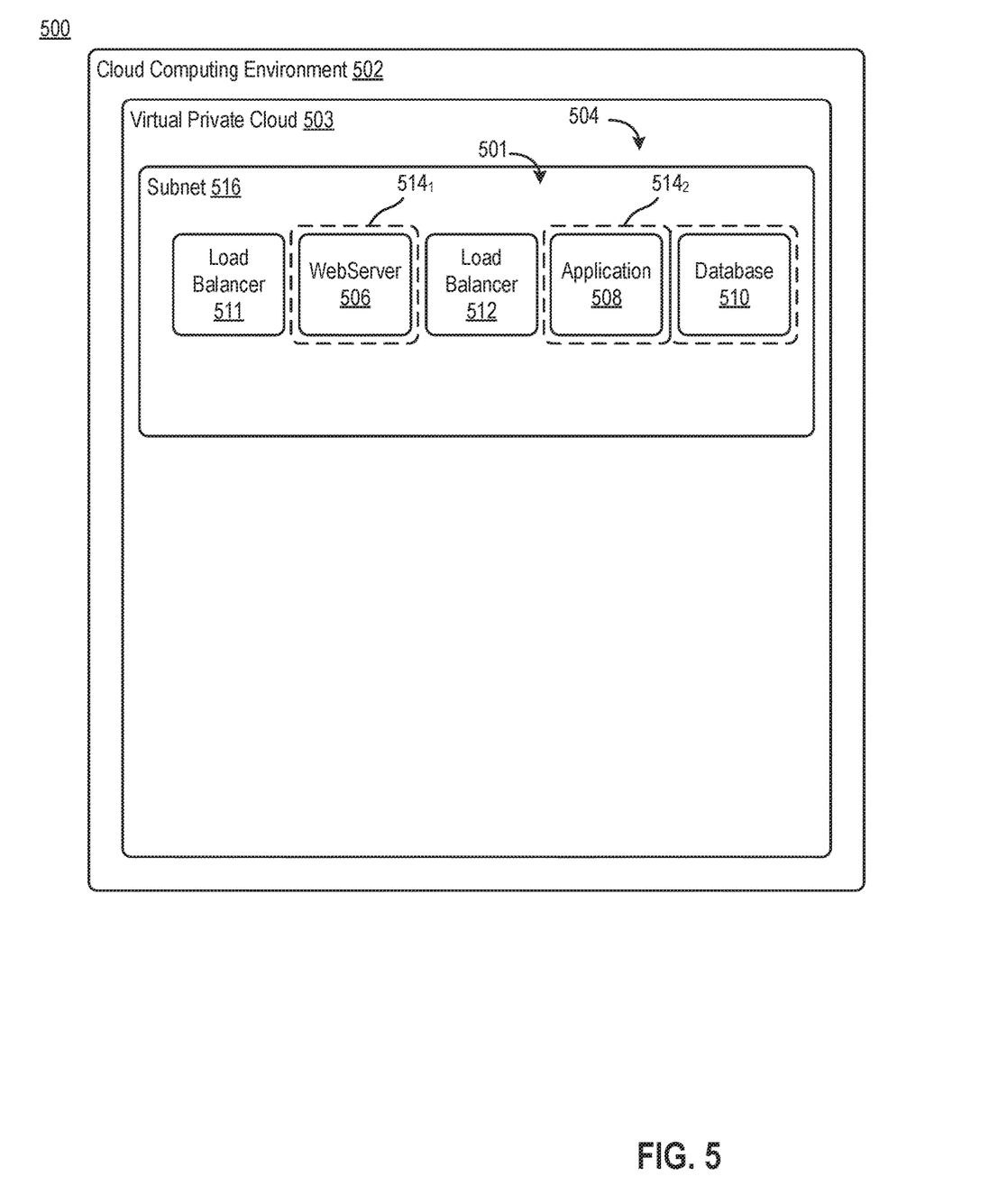
FIG. 5 is a network diagram for a target cloud computing environment, according to an embodiment.

FIG. 5 is a network diagram 500 generated by deployment director 110 given constraints defined from a cloud director associated with a target cloud computing environment of a first type, according to an embodiment. For example, the target cloud computing environment of FIG. 5 is AWS™ available from Amazon. As discussed above, deployment director 110 generates network diagram 600 based on both application blueprint 128 and received constraints defined by cloud director.

As shown, network diagram 500 illustrates cloud computing environment 502 having a virtual private cloud 503 deployed thereon. Deployed on virtual private cloud 503 is a three-tier application 504. Three tier-applications 504 includes one or more components 501, such as web server 506, application 508, database 510, load balancer 511, and load balancer 512 each corresponding to web server 214, application 216, database 218, load balancer 210, and load balancer 212 in FIG. 2, respectively. Each component 501 is commonly deployed on the same subnet (e.g., subnet 516) having IP 10.0.0.0/20. Although each component will have IPs (i.e., 10.0.0.0/20), predefined security groups will limit inbound access to each component. Thus, all components 501 are deployed into a single availability zone, which reduces overall network costs on cloud computing platform 502.

As discussed above, web server 506 is isolated from database 510. Because each component 501 is deployed to the same subnet 516, security groups $514_i$ are used to isolate components 501 according to logical connections and logical attributes defined in application blueprint. Generally, security groups may be used to control traffic to one or more components of a multi-tier application by defining one or more rules to the security group. For example, as illustrated in FIG. 5, security group $514_1$ is associated with web server 506, and security group $514_2$ is associated with application 508 and database 510. Accordingly, security group $514_2$ isolates database 510 from communication with web server 506.

Figure 6:
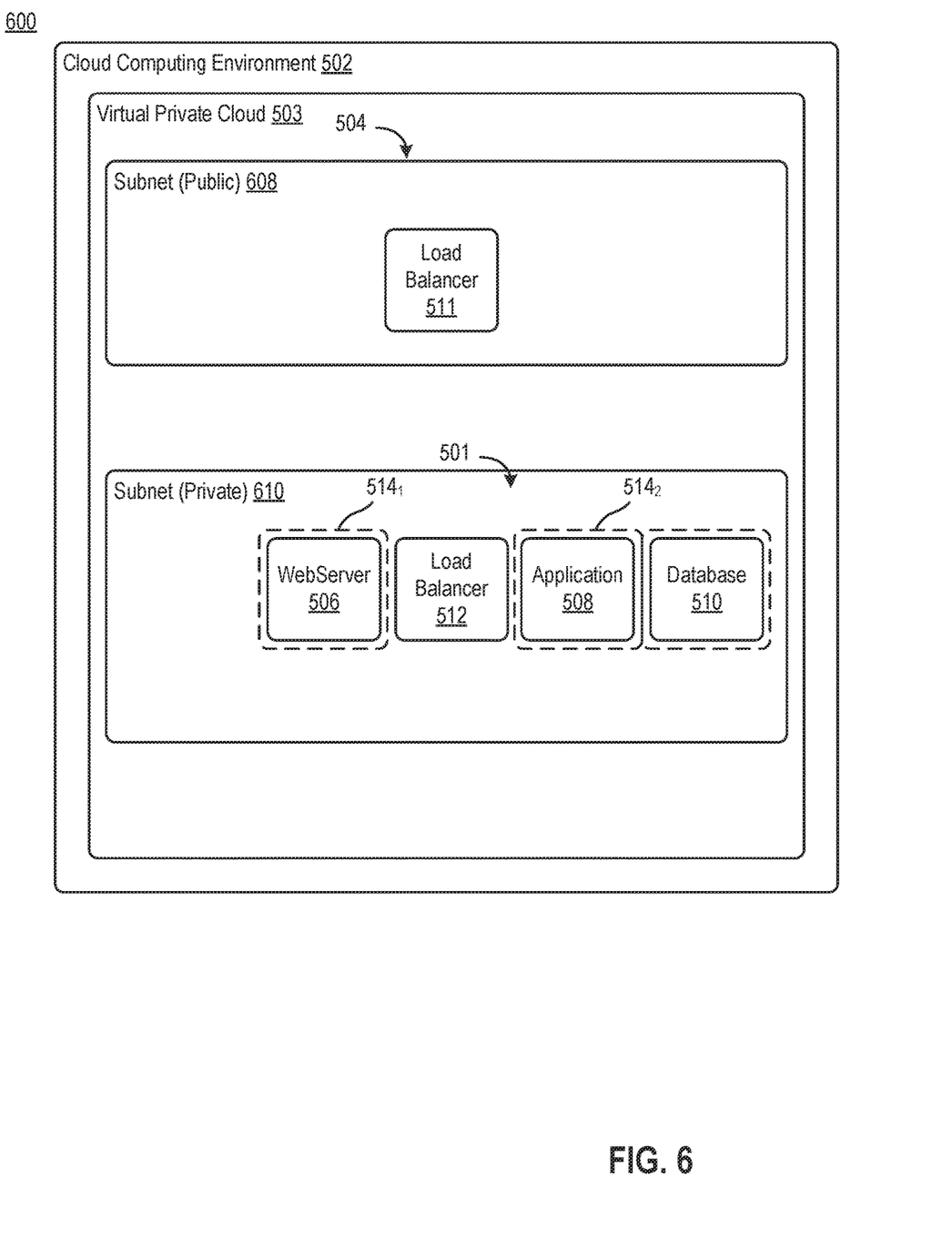
FIG. 6 is a network diagram for a target cloud computing environment, according to an embodiment.

FIG. 6 is a network diagram 600 generated by deployment director 110 given constraints defined from a cloud director associated with a target cloud computing environment of a first type, according to an embodiment. For example, the target cloud computing environment of FIG. 5 is AWS™ available from Amazon. As discussed above, deployment director 110 generates network diagram 600 based on both application blueprint 128 and received constraints defined by cloud director. Network diagram 600 is an alternative to network diagram 500 that was deployed in cloud computing environment 502.

Two subnets are created either in advance of deployment or on demand. As illustrated, isolated subnets 608 and 610 are created. Subnet 608 is a subnet having IP of 10.0.0.0/20. Subnet 610 is a private subnet having IP of 10.0.16.0/20. Application load balancing (i.e., load balancer 511) is deployed on subnet 608, while web server 506, application 508, and database 510 are deployed on private subnet 610. Accordingly, front end security is being performed by private subnet 610.

Additionally, as discussed above, application blueprint provides that web server 506 is to be isolated from database 510. Because each component 501 is deployed to private subnet 610, security groups $514_i$ are used to isolate components 501 according to logical connections and logical attributes defined in application blueprint. For example, as illustrated in FIG. 6, security group $514_1$ is associated with web server 506, and security group $514_2$ is associated with application 508 and database 510. Accordingly, security group $514_2$ isolates database 510 from communication with web server 506. Thus, security groups $514_i$ are used as back end security for internal traffic and routing rules.

Figure 7:
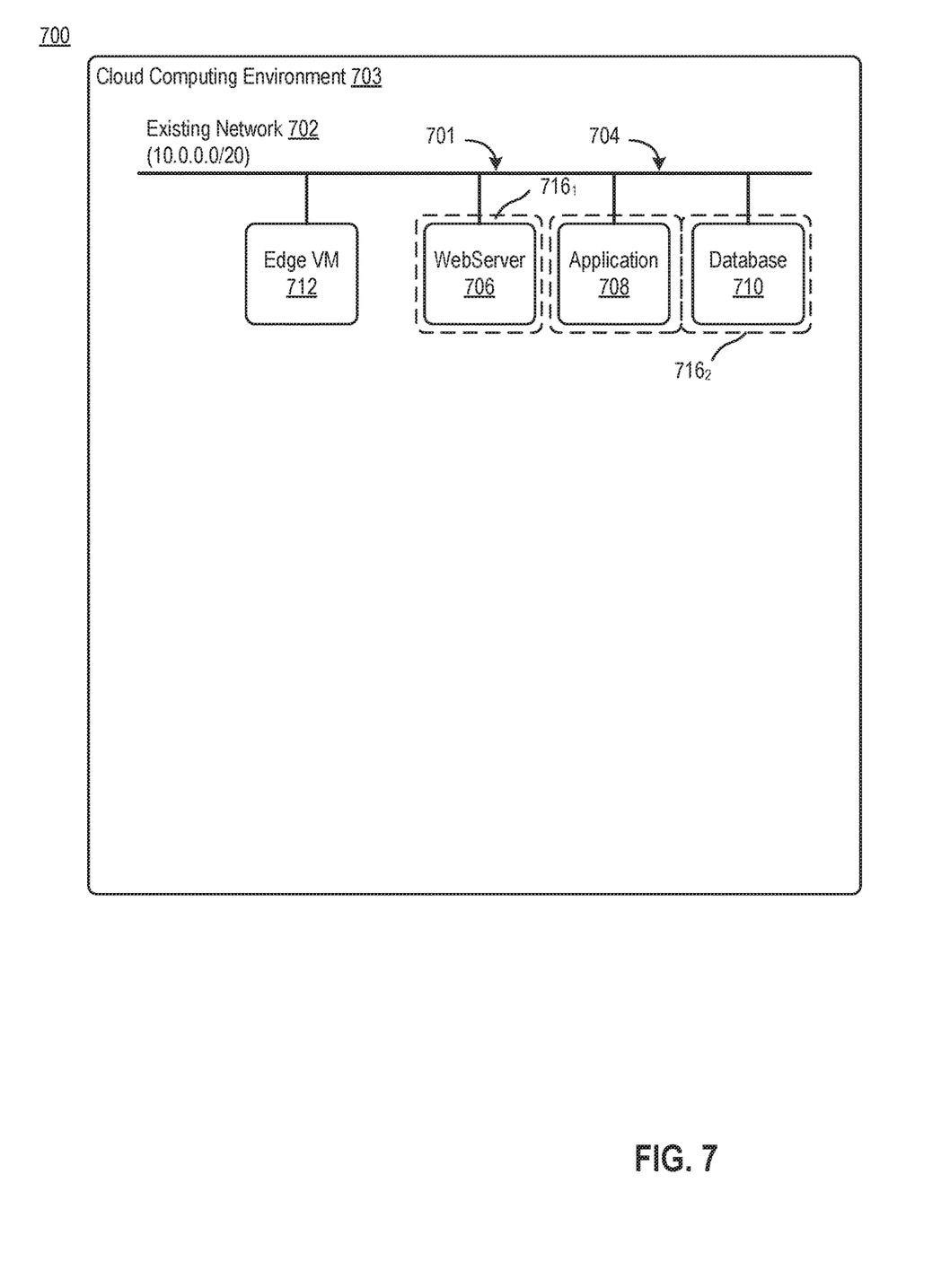
FIG. 7 is a network diagram for a target cloud computing environment, according to an embodiment.

FIG. 7 is a network diagram 700 generated by deployment director 110 given constraints defined from a cloud director associated with a target cloud computing environment of a first type, according to an embodiment. For example, the target cloud computing environment of FIG. 7 is NSX® for vSphere® available from VMware, Inc. As discussed above, deployment director 110 generates network diagram 700 based on both application blueprint 128 and received constraints defined by cloud director.

As shown, network diagram 700 includes an existing external network 702. For example, external network 702 may have IP address 10.0.0.0/20. A three-tier application 704 is deployed on network 702. Three tier-application 704 includes one or more components 701, such as web server 706, application 708, database 710, and edge VM 712. Each component 701 is commonly deployed on the same network (e.g., subnet 702) having IP 10.0.0.0/20. Although each component will have IPs (i.e., 10.0.0.0/20), predefined security groups will limit inbound access to each component. Thus, all components 701 are deployed on a single network 702, which reduces overall network costs on cloud computing platform 703.

To isolated components 701, as prescribed by application blueprint, security groups $716_i$ are used similarly to network diagram 500. For example, a first security group $716_1$ is associated with web server 706 and a second security group $716_2$ is associated with application 708 and database 710. Accordingly, web server 706 is isolated from communicating with database 710.

Figure 8:
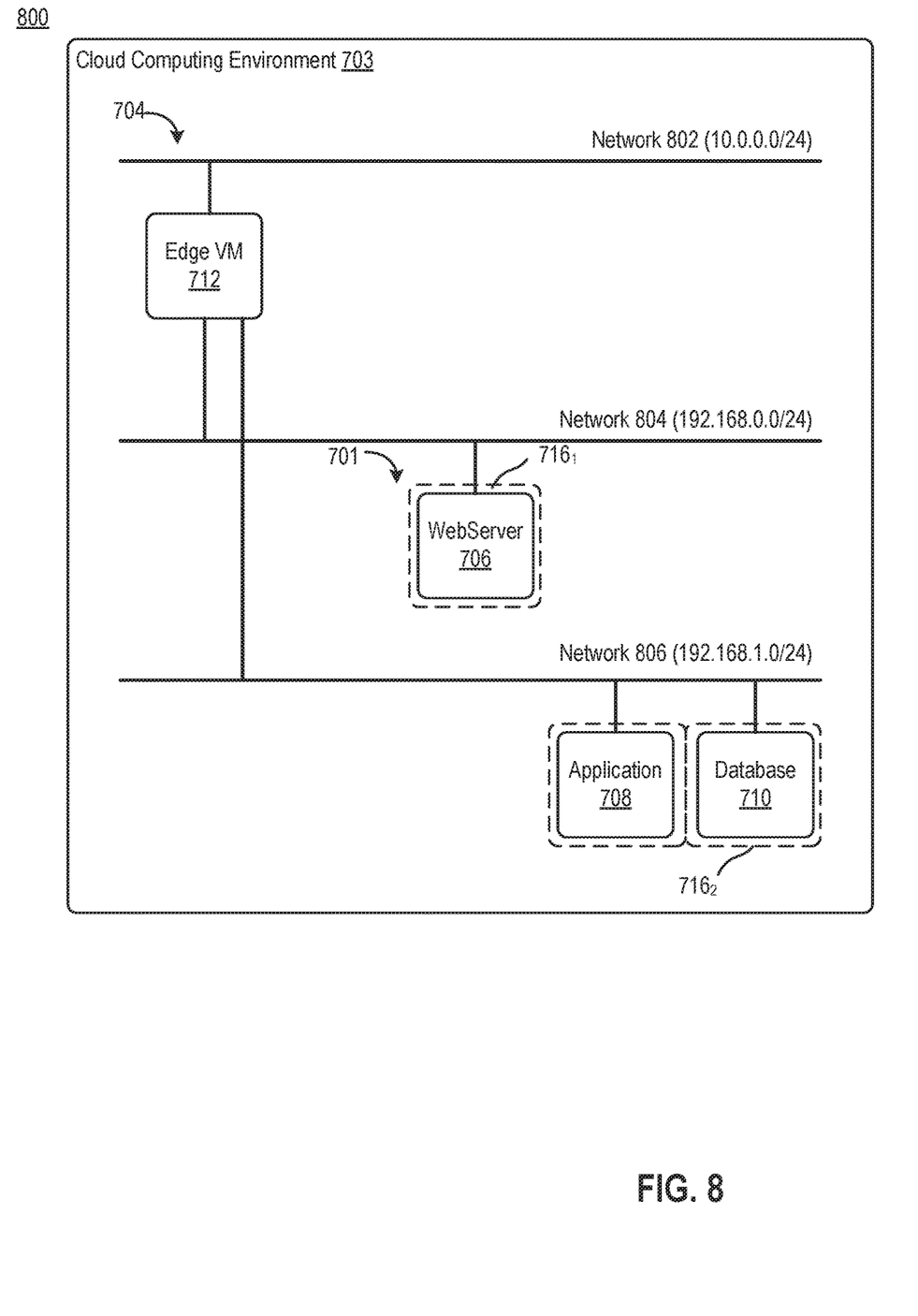
FIG. 8 is a network diagram for a target cloud computing environment, according to an embodiment.

FIG. 8 is a network diagram 800 generated by deployment director 110 given constraints defined from a cloud director associated with target cloud computing environment 703 of a first type, according to an embodiment. For example, the target cloud computing environment of FIG. 8 is NSX® for vSphere® available from VMware, Inc. As discussed above, deployment director 110 generates network diagram 800 based on both application blueprint 128 and received constraints defined by cloud director.

Network diagram 800 differs from network diagram 700 in that network diagram 800 includes three networks, network 802 having IP addresses in the range 10.0.0.0/24, network 804 having IP addresses in the range 192.168.0.0/24, and network 806 having IP addresses in the range 192.168.1.0/24. As shown, edge VM 712 is deployed on network 802, web server 706 is deployed on network 804, and application 708 and database 710 are deployed on network 806. Accordingly, web server 706 is isolated from database 710 by being deployed on a separate network. Thus, network diagram 800 is consistent with application blueprint that was generated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of generating a network diagram for a multi-tier application to be deployed on a cloud computing environment, comprising:
    receiving a request from an application director to deploy the multi-tier application to a target cloud computing environment;
    receiving an application blueprint of the multi-tier application generated by the application director, wherein the application blueprint includes logical attributes for each of a plurality of components of the multi-tier application, and logical connections indicative of dependencies between the plurality of components, and wherein the application blueprint is agnostic to the target cloud computing environment, and wherein a visual representation of a line between a first component of the multi-tier application and a second component of the multi-tier application in the application blueprint represents a virtual network interface card (vNIC) between the first component and the second component and indicates that connectivity between the first component and the second component is allowed and does not define physical network connections between the first and second components, wherein absence of a visual representation of a line between a third component of the multi-tier application and a fourth component of the multi-tier application in the application blueprint indicates the third component and the fourth component are isolated from each other, wherein the application blueprint does not define logical network connections, and wherein the logical attributes comprise network constraints indicating networking requirements that must be met for each of the plurality of components when deployed in a networking environment;

receiving an identification of the target cloud computing environment and one or more constraints associated with the target cloud computing environment from the application director, the one or more constraints indicating a network structure specific to the target cloud computing environment;

in response to receiving the application blueprint and the identification of the target cloud computing environment, generating, without user specification of any network connections, a first network diagram compatible with the target cloud computing environment based on the one or more constraints associated with the target cloud computing environment and the application blueprint including the network constraints, wherein the first network diagram illustrates a physical network structure of the target cloud computing environment that defines network connections between the plurality of components; and displaying the first network diagram.

2. The method of claim 1, wherein generating the first network diagram compatible with the target cloud computing environment based on constraints of the identified target cloud computing environment and the application blueprint, wherein the first network diagram illustrates the physical network structure, comprises:

requesting from a cloud director of the target cloud computing environment the one or more constraints associated with the target cloud computing environment; and receiving the one or more constraints from the cloud director.

3. The method of claim 2, further comprising:

applying the one or more constraints from the cloud director to the application blueprint.

4. The method of claim 1, wherein generating the first network diagram compatible with the target cloud computing environment based on constraints of the identified target cloud computing environment and the application blueprint, wherein the first network diagram illustrates the physical network structure, comprises:

isolating a first component of the application blueprint from a second component of the application blueprint by associating a first security group with the first component and a second security group with the second component.

5. The method of claim 1, wherein generating the first network diagram compatible with the target cloud computing environment based on constraints of the identified target cloud computing environment and the application blueprint, wherein the first network diagram illustrates the physical network structure, comprises:

isolating a first component of the application blueprint from a second component of the application blueprint by assigning the first component to a first network and assigning the second component to a second network.

6. The method of claim 1, further comprising:

receiving a request to deploy the multi-tier application to a second cloud computing environment;

receiving an identification of the second cloud computing environment;

generating a second network diagram compatible with the second cloud computing environment based on at least the application blueprint, wherein the second network diagram illustrates the physical network structure of the second cloud computing environment; and displaying the second network diagram for a developer on a client device.

7. The method of claim 6, wherein generating the second network diagram compatible with the second cloud computing environment based on at least the application blueprint, wherein the second network diagram illustrates the physical network structure of the second cloud computing environment, comprises:

requesting from a cloud director of the second cloud computing environment one or more second constraints associated with the second cloud computing environment; and receiving the one or more second constraints from the cloud director of the second cloud computing environment.

8. The method of claim 1, where one of the network constraints indicates one of the plurality of components requires one or more of: a routable IP address, to be connected to a public network, or to be connected to a private network.

9. A non-transitory computer readable medium having instructions stored thereon that when executed by a processor cause the processor to perform a method of generating a network diagram for a multi-tier application to be deployed on a cloud computing environment, comprising:

receiving a request from an application director to deploy the multi-tier application to a target cloud computing environment;

receiving an application blueprint of the multi-tier application generated by the application director, wherein the application blueprint includes logical attributes for each of a plurality of components of the multi-tier application, and logical connections indicative of dependencies between the plurality of components, and wherein the application blueprint is agnostic to the target cloud computing environment, and wherein a visual representation of a line between a first component of the multi-tier application and a second component of the multi-tier application in the application blueprint represents a virtual network interface card (vNIC) between the first component and the second component and indicates that connectivity between the first component and the second component is allowed and does not define physical network connections between the first component and the second component, wherein absence of a visual representation of a line between a third component of the multi-tier application and a fourth component of the multi-tier application in the application blueprint indicates the third component and the fourth component are isolated from each other, wherein the application blueprint does not define logical network connections, and wherein the logical attributes comprise network constraints indicating networking requirements that must be met for each of the plurality of components when deployed in a networking environment;

receiving an identification of the target cloud computing environment and one or more constraints associated with the target cloud computing environment from the application director, the one or more constraints indicating a network structure specific to the target cloud computing environment;

in response to receiving the application blueprint and the identification of the target cloud computing environment, generating, without user specification of any network connections, a first network diagram compatible with the target cloud computing environment based on the one or more constraints associated with the target cloud computing environment and the application blueprint including the network constraints, wherein the first network diagram illustrates a physical network structure of the target cloud computing environment that defines network connections between the plurality of components; and displaying the first network diagram.

10. The non-transitory computer readable of claim 9, wherein generating the first network diagram compatible with the target cloud computing environment based on constraints of the identified target cloud computing environment and the application blueprint, wherein the first network diagram illustrates the physical network structure, comprises:

requesting from a cloud director of the target cloud computing environment the one or more constraints associated with the target cloud computing environment; and receiving the one or more constraints from the cloud director.

11. The non-transitory computer readable of claim 10, further comprising:

applying the one or more constraints from the cloud director to the application blueprint.

12. The non-transitory computer readable of claim 9, wherein generating the first network diagram compatible with the target cloud computing environment based on constraints of the identified target cloud computing environment and the application blueprint, wherein the network diagram illustrates the physical network structure, comprises:

isolating a first component of the application blueprint from a second component of the application blueprint by associating a first security group with the first component and a second security group with the second component.

13. The non-transitory computer readable of claim 9, wherein generating the first network diagram compatible with the target cloud computing environment based on constraints of the identified target cloud computing environment and the application blueprint, wherein the first network diagram illustrates the physical network structure, comprises:

isolating a first component of the application blueprint from a second component of the application blueprint by assigning the first component to a first network and assigning the second component to a second network.

14. The non-transitory computer readable of claim 9, further comprising:

receiving a request to deploy the multi-tier application to a second cloud computing environment;

receiving an identification of the second cloud computing environment;

generating a second network diagram compatible with the second cloud computing environment based on at least the application blueprint, wherein the second network diagram illustrates the physical network structure of the second cloud computing environment; and displaying the second network diagram for a developer on a client device.

15. The non-transitory computer readable of claim 14, wherein generating the second network diagram compatible with the second cloud computing environment based on at least the application blueprint, wherein the second network diagram illustrates the physical network structure of the second cloud computing environment, comprises:

requesting from a cloud director of the second cloud computing environment one or more second constraints associated with the second cloud computing environment; and receiving the one or more second constraints from the cloud director of the second cloud computing environment.

16. A computer system, comprising:

a processor; and a memory storing program code, which, when executed on the processor, performs a method of generating a network diagram for a multi-tier application to be deployed on a cloud computing environment, the method comprising:

receiving a request from an application director to deploy the multi-tier application to a target cloud computing environment;

receiving an application blueprint of the multi-tier application generated by the application director, wherein the application blueprint includes logical attributes for each of a plurality of components of the multi-tier application, and logical connections indicative of dependencies between the plurality of components, and wherein the application blueprint is agnostic to the target cloud computing environment, and wherein a visual representation of a line between a first component of the multi-tier application and a second component of the multi-tier application in the application blueprint represents a virtual network interface card (vNIC) between the first component and the second component and indicates that connectivity between the first component and the second component is allowed and does not define physical network connections between the first component and the second component, wherein absence of a visual representation of a line between a third component of the multi-tier application and a fourth component of the multi-tier application in the application blueprint indicates the third component and the fourth component are isolated from each other, wherein the application blueprint does not define logical network connections and wherein the logical attributes comprise network constraints indicating networking requirements that must be met for each of the plurality of components when deployed in a networking environment;

receiving an identification of the target cloud computing environment and one or more constraints associated with the target cloud computing environment from the application director, the one or more constraints indicating a network structure specific to the target cloud computing environment;

in response to receiving the application blueprint and the identification of the target cloud computing environment, generating, without user specification of any network connections, a first network diagram compatible with the target cloud computing environment based on the one or more constraints associated with the target cloud computing environment and the application blueprint including the network constraints, wherein the first network diagram illustrates a physical network structure of the target cloud computing environment that defines network connections between the plurality of components; and displaying the first network diagram.

17. The computer system of claim 16, wherein generating the first network diagram compatible with the target cloud computing environment based on constraints of the identified target cloud computing environment and the application blueprint, wherein the first network diagram illustrates the physical network structure, comprises:

requesting from a cloud director of the target cloud computing environment the one or more constraints associated with the target cloud computing environment; and receiving the one or more constraints from the cloud director.

18. The computer system of claim 17, further comprising:
applying the one or more constraints from the cloud director to the application blueprint.

19. The computer system of claim 16, wherein generating the first network diagram compatible with the target cloud computing environment based on constraints of the identified target cloud computing environment and the application blueprint, wherein the first network diagram illustrates the physical network structure, comprises:

isolating a first component of the application blueprint from a second component of the application blueprint by associating a first security group with the first component and a second security group with the second component.

20. The computer system of claim 16, wherein generating the first network diagram compatible with the target cloud computing environment based on constraints of the identified target cloud computing environment and the application blueprint, wherein the first network diagram illustrates the physical network structure, comprises:

isolating a first component of the application blueprint from a second component of the application blueprint by assigning the first component to a first network and assigning the second component to a second network.

21. The computer system of claim 16, further comprising:
receiving a request to deploy the multi-tier application to a second cloud computing environment;

receiving an identification of the second cloud computing environment;

generating a second network diagram compatible with the second cloud computing environment based on at least the application blueprint, wherein the second network diagram illustrates the physical network structure of the second cloud computing environment; and displaying the second network diagram for a developer on a client device.

* * * * *